Sept. 29, 1953   K. J. KRAUS   2,653,475
MULTIPLE PLATFORM WEIGHT ANALYZER
Filed June 6, 1949   3 Sheets-Sheet 1
FIG. 1.
FIG. 2.
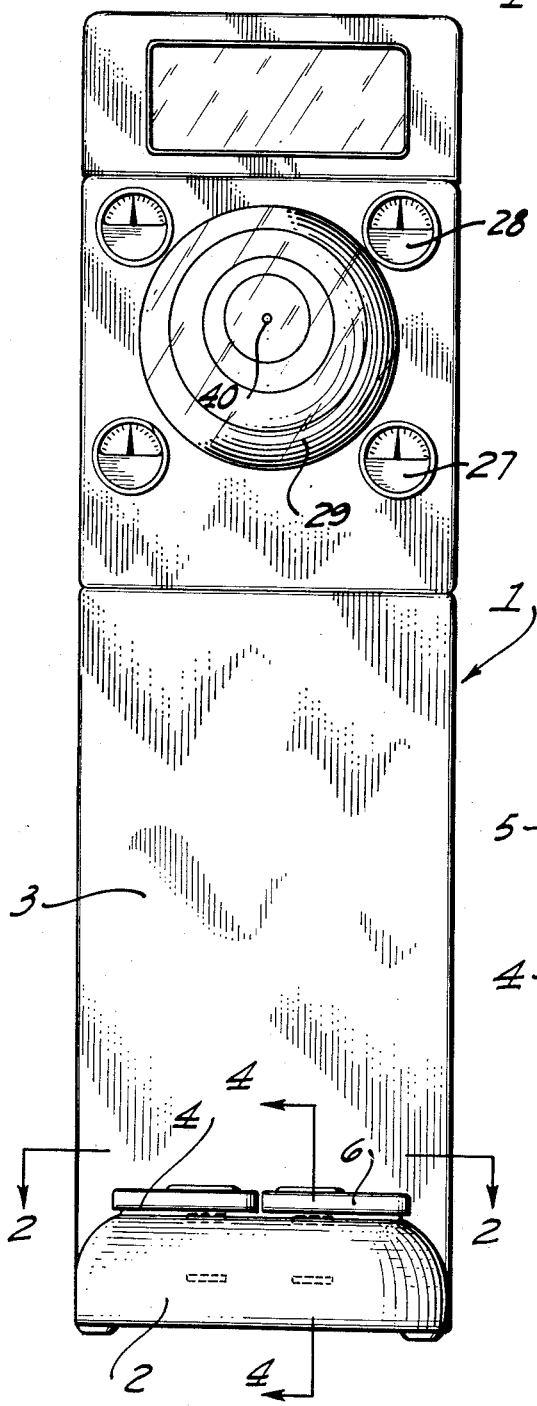
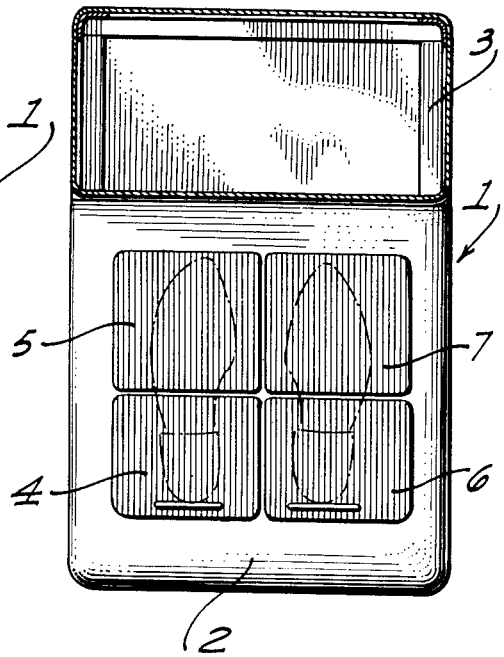
INVENTOR.
KARL J. KRAUS,
BY
ATTORNEY.

Sept. 29, 1953  K. J. KRAUS  2,653,475
MULTIPLE PLATFORM WEIGHT ANALYZER
Filed June 6, 1949  3 Sheets-Sheet 2
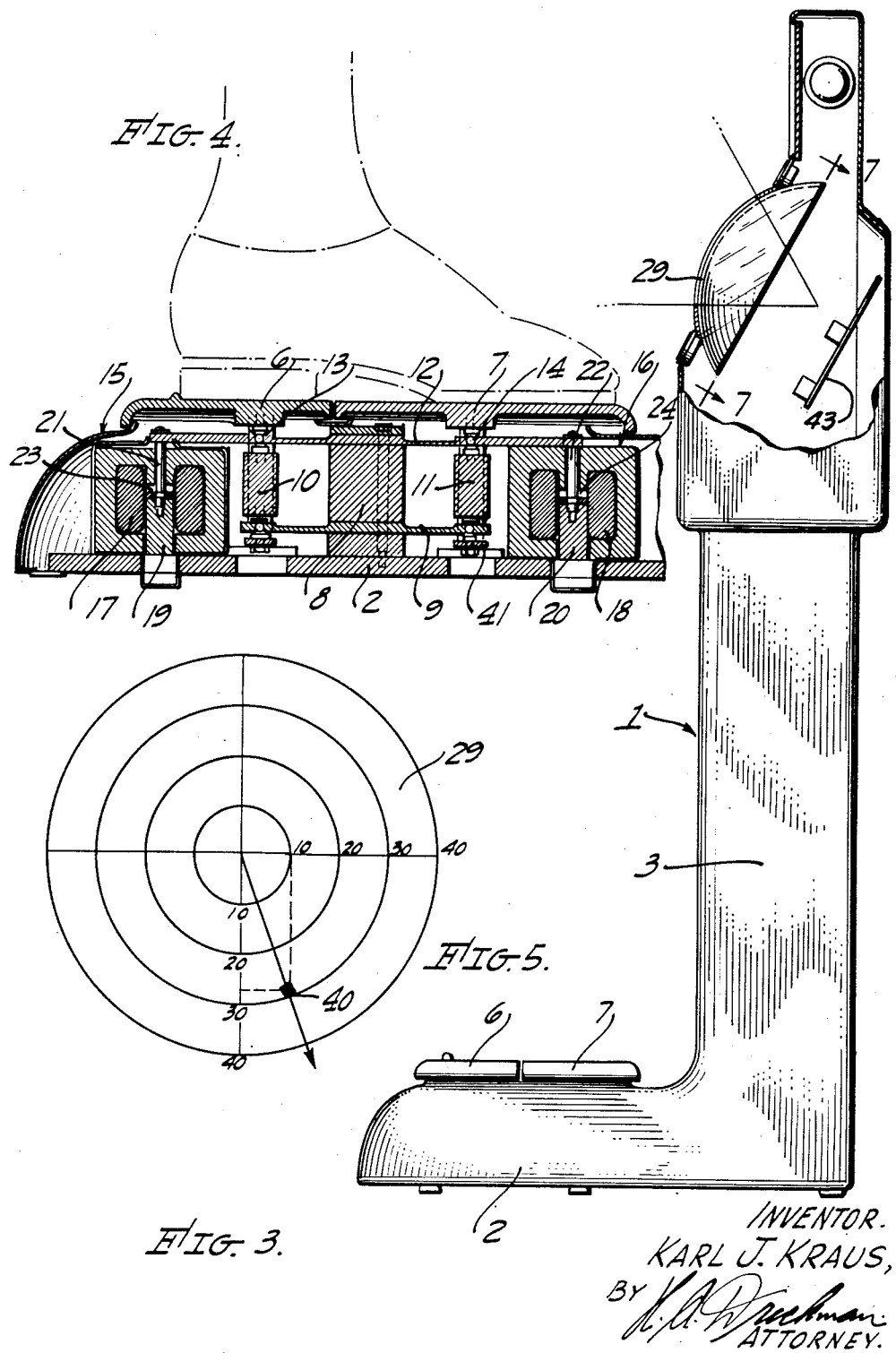
INVENTOR.
KARL J. KRAUS,
BY
ATTORNEY.

Sept. 29, 1953  K. J. KRAUS  2,653,475
MULTIPLE PLATFORM WEIGHT ANALYZER
Filed June 6, 1949  3 Sheets-Sheet 3
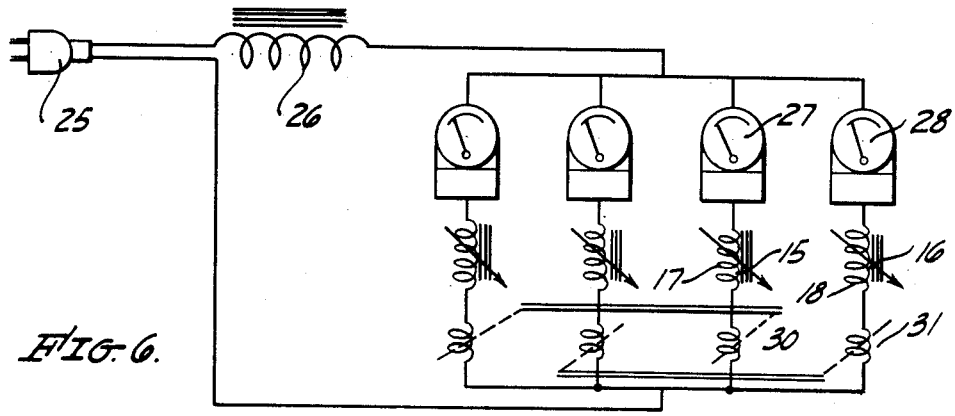
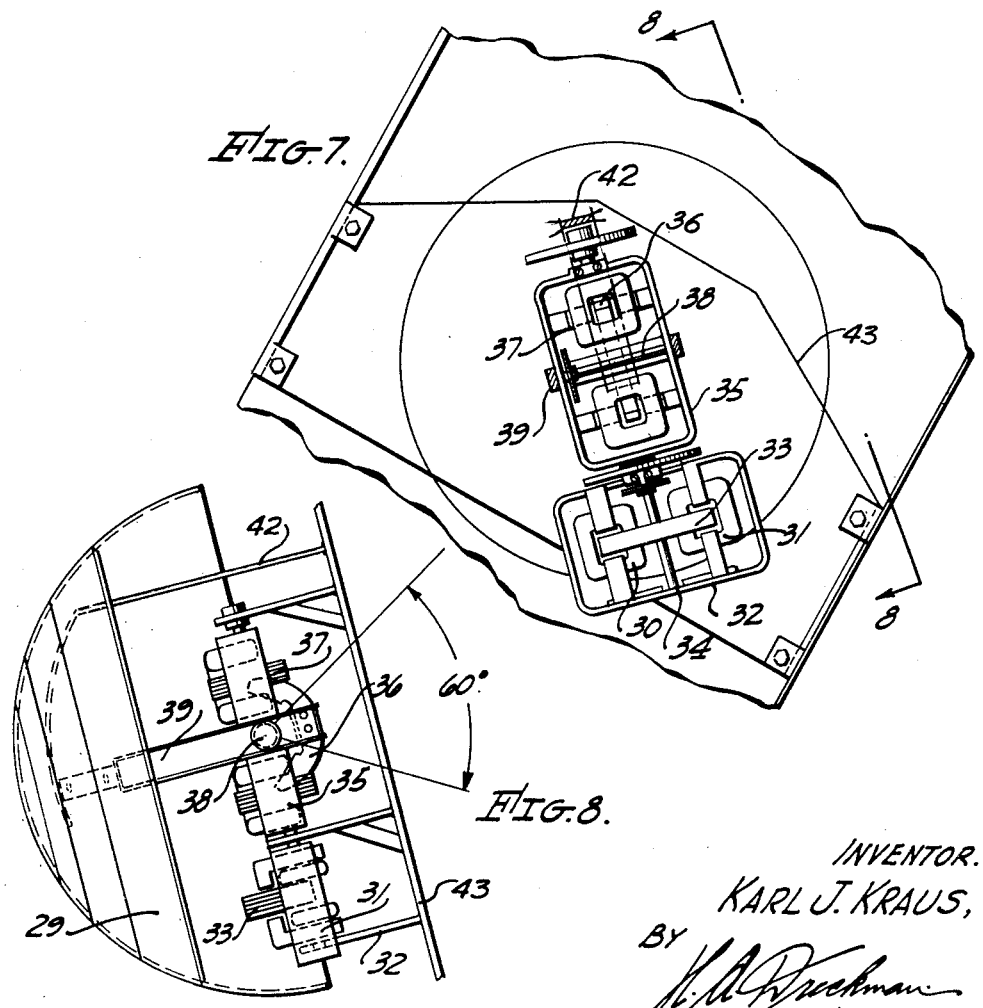
INVENTOR.
KARL J. KRAUS,
BY
ATTORNEY.

Patented Sept. 29, 1953

2,653,475

UNITED STATES PATENT OFFICE 2,653,475

MULTIPLE PLATFORM WEIGHT ANALYZER

Karl J. Kraus, Las Vegas, Nev.

Application June 6, 1949, Serial No. 97,395

8 Claims. (Cl. 73—172)

This invention is an improvement over my prior Patent Number 2,374,105, issued April 17, 1945, and the prime object of my invention is to resolve the differences in pressures on a plurality of pedals upon which a person stands into ratios of unbalance in a number of individual meters, as well as to indicate by means of a mechanical indicator the linear displacement of the center of effort of the forces on the pedals, that is, the center of gravity of the person being weighed.

More particularly, this invention is directed to a weighing scale, which has a plurality of weight bearing pedals or platforms and an indicating dial connected to each platform, as well as a hemisphere which rotates about two mutually perpendicular axes thereby registering the weight carried by the ball and heel of each foot, and also the total weight of the person standing on the platform, if desired.

My apparatus is designed primarily for use by physicians in detecting deformities in body bone structure, as well as abnormal habits of posture, and also to test the sense of balance of a patient.

An object of my invention is to provide an apparatus which will indicate the percentage and direction of the total human body weight which might be deviated from the center of gravity, that is, the exact and precise relationship of the human body weight in the standing position relative to the center of gravity.

A feature of my invention is to provide in an apparatus of the character stated a mechanical means to mechanically compute and solve the problem in terms of percentage of direction of body weight deviating from the center of gravity.

I have discovered that the weight distribution pattern for any individual is relatively consistent and fixed, this pattern or weight distribution proportion normally remains the same or consistent unless body disease, accident or gross body weight changes should alter it.

Other objects, advantages and features of invention may appear from the accompanying drawing, the subjoined detailed description and the appended claims.

In the drawing:

Figure 1 is a front elevation of my weight analyzer.

Figure 2 is a transverse sectional view taken on line 2—2 of Figure 1.

Figure 3 is a side elevation of my weight analyzer with parts broken away to show interior construction.

Figure 4 is an enlarged fragmentary sectional view taken on line 4—4 of Figure 1.

Figure 5 is a diagram indicating a sample weight analysis.

Figure 6 is a wiring diagram of the electrical parts of my machine.

Figure 7 is a sectional view taken on line 7—7 of Figure 3.

Figure 8 is a sectional view taken on line 8—8 of Figure 7.

Very briefly, my weight analyzer 1 consists of four platforms, two for each foot, and an indicating device connected with each platform, which indicates the weight imposed thereon, and also a mechanical device which will indicate the direction of total body weight deviated from the center of gravity of the human body.

The analyzer 1 consists of a base 2 and a vertical standard 3, which are preferably integral. Four weight bearing platforms 4, 5, 6, 7 are mounted on the platform 2 and the person stands on all four of these platforms, the platforms 4 and 6 accommodating the heel of the person, and the platforms 5 and 7 accommodating the toes of the person. The person to be weighed must be centered on these platforms so that a predetermined weight bearing vertical line passes through the center of the internal malleolus or ankle bone. This line is used as a focal point for placing or centering the feet. This centering on the platform can be accomplished by suitably positioning the heel of the person to be weighed.

Since the platforms 4, 5, 6, 7 are identically mounted, only one pair will be described in detail:

The base 2 is provided with a vertical post 8 which is mounted in the base. A cantilever beam 9 is mounted on the post 8 and extends horizontally in the base. The platform 6 is mounted on one end of the beam 9 by a pin 10, and the platform 7 is similarly mounted on the opposite end of the beam 9 by the pin 11. A second cantilever beam 12 is mounted on top of the post 8 and extends parallel to the beam 9. The platform 6 is mounted on the beam 12, as shown at 13, and the platform 7 is similarly mounted on the opposite side of the beam 12, as shown at 14. A pair of reactor units 15—16 are mounted in the base 2 and each reactor unit consists of coils 17—18, respectively, which are electrically energized, as will be further described.

Metallic armatures 19—20 are movable vertically within the coils 17—18, respectively. Since these armatures are connected to the ends of the beam 12 by the links 21—22, respectively, vertical movement of the armatures 19—20 will vary the air gaps 23 or 24, which varies the current flowing through the coil 17 or 18. In other words, when weight is applied to the platform 6—7, the beam 12 will deflect downwardly, thus varying the air gaps 23 and 24. The current is at a minimum when there is no load on the platforms and reaches its maximum when the air gaps 23 or 24 are at their maximum.

Electrical current is fed to the coils 17—18 from a suitable source 25. The current first passes through the limiting reactants and thence to the coil 17—18. These coils are connected in series with the dial indicators 27 and 28, respectively. These indicators are calibrated in pounds so that the amount of weight exerted by the toe and the heel of both the right and the left foot is shown directly. Thus, by reading the four indicators it is possible to directly determine whether there is an excessive weight at the posterior or the anterior, or the left lateral or the right lateral. The sum of the readings of the indicators will, of course, give the total weight of the person.

While the indicators 27—28 will show the various weights on the different platforms, I also desire to visually show the amount of unbalance of the person, and, also, the percentage of unbalance. This is shown in Figures 5 to 8, inclusive, and consists of the following structures;

In the top of the standard 3, where it may be easily observed, I mount a hemisphere 29, which is calibrated on its face with concentric circles, preferably representing percentage of weight, as will be subsequently described. The hemisphere 29 is formed from a transparent material such as glass or plastic.

Variable weight distribution reactor coils 30—31 are connected in series with the coils 17—18, respectively. These reactor coils are mounted in a frame 32, which is mounted in the upper end of the standard 3. An armature 33 moves relative to the coils 30—31, and this armature is fixed to a shaft 34, which is secured to and rotates the frame 35 carrying the other two reactor coils 37. The frame 35 is also journalled in the upper end of the standard 3, substantially as shown. The armature 36, which moves relative to the second reactor coils 37, is mounted on and rotates the shaft 38. Arms 39 are fixed to the shaft 38 and to the hemisphere 29, thus moving this hemisphere in two planes at right angles to each other. In other words, the hemisphere rotates about two mutually perpendicular axes, thus effecting a linear displacement from the fixed center 40 to indicate the position of the center of gravity of the person being weighed. The center 40 is a dot which is marked on a fixed arm 42 rising from the top plate 43 of the standard 3. Considering Figure 5 as an example, I note that there is a displacement to the right of 10% and a further displacement rearwardly of 30%. This result can be read directly on the hemisphere 29. To limit the downward movement of the beams 9 and 12, I provide a vertical stop 41 below each end of the beam 9, thus limiting the maximum size of the air gaps 23 or 24.

Since the hemisphere 29 is attached to the shaft 38 by the arms 39, it will move in two different planes i. e. it will follow the movement of the shaft 38.

Operation

In operation, when a person stands on the four platforms 4, 5, 6, 7 a vertical displacement of the cantilever beams 9 and 12 is obtained. The resultant amplification of the deflection of the beams 9 and 12 will be translated into a variation of electrical current, which flows through the coils 17—18. This current is at a minimum when there is no load on the pedals and reaches its maximum when the air gaps 23—24 are at a maximum. Since the variable inductances vary, the current in each platform unit (17 or 18) the proportion of the total current to each unit varies so as to distribute the current in each unit as a percentage of the total load on all four platforms. This characteristic of my device is used to show a percentage reading on the standard calibrated ammeters (27 and 28), each ammeter being labled to correspond with the particular platform to which it is connected. It is thus possible to have a child of 50 pounds register normally or 25% of the weight on each platform, and, at another time, have a 300 pound man indicate the same balance if, in fact, 25% of the weight is on each platform. Due to the fact that the coils (30, 31, 37) of each quadrant of the hemisphere 29 is in series with the platform coils (17—18) it then follows that by calibration of the hemisphere 29 an actual linear shift of the person's center of gravity can be read directly. Obviously, the scale on the hemisphere 29 may be variously arranged, such as: Excellent Balance, Good Balance, Fair Balance, or Poor Balance. When the person is passive and centered on the platforms and in a relatively normal relaxed position, the weight distribution pattern posture and percentage and direction of total body weight deviating from the center of gravity will be indicated.

Having described my invention, I claim:

1. An apparatus for indicating the weight distribution of the human body in standing position comprising, a base, a plurality of weight sustaining platforms for each foot, respectively, mounted on the base, means resiliently mounting each of the platforms, a vertical standard rising from the base, a variable reactor adjacent each platform, an armature in each reactor, means connecting each said armature and an adjacent platform whereby weight on the platform will adjust the armature in the reactor and vary the current flowing through the associated reactor, and indicating means mounted on the standard, said indicating means being electrically connected to each of said reactors, said means indicating the direction of body weight deviation from the norm, said indicating means comprising a calibrated transparent hemisphere, and a means on which the hemisphere is mounted including two angularly arranged axes to move said hemisphere synchronously with the movement of the platforms when weight is placed on the platforms, said last named means being electrically connected to the reactors, a fixed center mark below the hemisphere and observable therethrough, said hemisphere moving with relation to the fixed center mark to indicate an unbalanced condition.

2. An apparatus for indicating the weight distribution of the human body in standing position comprising, a base, a plurality of weight sustaining platforms for each foot, respectively, mounted on the base, means resiliently mounting each of the platforms, a vertical standard rising from the base, a variable reactor adjacent each platform, an armature in each reactor, means connecting each said armature and an adjacent platform whereby weight on the platform will adjust the armature in the reactor and vary the current flowing through the associated reactor, and indicating means mounted on the standard, said indicating means being electrically connected to each of said reactors, said means indicating the percentage and direction of body weight deviation from the norm, said indicating means comprising a calibrated transparent hemisphere, and a means on which the hemisphere is mounted including two angularly arranged axes to move said hemisphere synchronously with the movement of the platforms when weight is placed on the platforms, said last named means being electrically connected to the reactors, a fixed center mark below the hemisphere and observable therethrough, said hemisphere moving with relation to the fixed center mark to indicate an unbalanced condition.

3. An apparatus for indicating the weight distribution of the human body in standing position comprising, a base, a plurality of weight sustaining platforms for each foot, respectively, on the base, means resiliently mounting each of the platforms, a vertical standard rising from the base, a variable reactor mounted in the base below each platform, an armature in each reactor connected to an adjacent platform, said armature being movable when weight is placed on the platform, a transparent hemisphere mounted on the standard, said hemisphere being movable about two axes, said axes being at right angles to each other, electrical means mechanically connected to each axis whereby the axes are rotated, said electrical means being electrically connected to said reactors, a fixed center mark below the hemisphere and observable through the hemisphere, said hemisphere moving with relation to the fixed center mark to indicate unbalanced condition.

4. An apparatus for indicating the weight distribution of the human body in standing position comprising, a base, a plurality of weight sustaining platforms for each foot, respectively, on the base, means resiliently mounting each of the platforms, a vertical standard rising from the base, a variable reactor mounted in the base below each platform, an armature in each reactor connected to an adjacent platform, said armature being movable when weight is placed on the platform, a transparent hemisphere mounted on the standard, said hemisphere being movable about two axes, said axes being at right angles to each other, electrical means mechanically connected to each axis whereby the axes are rotated, said electrical means being electrically connected to said reactors, a fixed center mark below the hemisphere and observable through the hemisphere, said hemisphere moving with relation to the fixed center mark to indicate unbalanced condition, said electrical means comprising, a coil, an armature movable relative to said coil, said armature being connected to one axis of the hemisphere, a second coil, a second armature connected to another axis of the hemisphere, each of said coils being electrically connected in series to said reactors.

5. An apparatus for indicating the weight distribution of the human body in standing position comprising, a base, a plurality of weight sustaining platforms for each foot, respectively, on the base, means resiliently mounting each of the platforms, a vertical standard rising from the base, a variable reactor mounted in the base below each platform, an armature in each reactor connected to an adjacent platform, said armature being movable when weight is placed on the platform, a transparent hemisphere mounted on the standard, said hemisphere being movable about two axes, said axes being at right angles to each other, electrical means mechanically connected to each axis whereby the axes are rotated, said electrical means being electrically connected to said reactors, a fixed center mark below the hemisphere and observable through the hemisphere, said hemisphere moving with relation to the fixed center mark to indicate unbalanced condition, and an indicating means operatively connected to each of said reactors for indicating the weight imposed on the individual platforms.

6. An apparatus for indicating the weight distribution of the human body in standing position comprising, a base, a plurality of weight sustaining platforms for each foot, respectively, on the base, means resiliently mounting each of the platforms, a vertical standard rising from the base, a variable reactor mounted in the base below each platform, an armature in each reactor connected to an adjacent platform, said armature being movable when weight is placed on the platform, a transparent hemisphere mounted on the standard, said hemisphere being movable about two axes, said axes being at right angles to each other, electrical means mechanically connected to each axis whereby the axes are rotated, said electrical means being electrically connected to said reactors, a fixed center mark below the hemisphere and observable through the hemisphere, said hemisphere moving with relation to the fixed center mark to indicate unbalanced condition, said electrical means comprising, a coil, an armature movable to said coil, said armature being connected to one axis of the hemisphere, a second coil, a second armature connected to another axis of the hemisphere, each of said coils being electrically connected in series to said reactors, and an indicating means operatively connected to each of said reactors for indicating the weight imposed on the individual platforms.

7. An apparatus for indicating the weight distribution of the human body comprising, a base, a plurality of weight sustaining platforms for each foot, respectively on said base, means resiliently mounting each of the platforms, electrical means mounted on the base, said electrical means being of the type where weight thereon will vary the current flowing through the same, said electrical means being operatively connected to each of said platforms to indicate the weight imposed thereon individually, an ammeter electrically connected to each of said electrical means, said ammeter being calibrated in pounds, a vertical standard rising from the base, and weight indicating means mounted on the vertical standard electrically connected to each of said electrical means, the weight indicating means indicating the direction of body weight deviation from the norm, said weight indicating means comprising a calibrated transparent hemisphere, means on which the hemisphere is mounted including two angularly arranged axes to move said hemisphere synchronously with the movement of the platforms when weight is placed thereon, a center marked arm on the vertical standard, said hemisphere moving with relation to the center marked arm to indicate an unbalanced condition.

8. An apparatus for indicating the weight distribution of the human body in standing position comprising, a base, a plurality of weight sustaining platforms for each foot, respectively, on said base, means resiliently mounting each of the platforms, an electrical reactor unit adjacent each platform, each platform being mounted on an electrical reactor, each reactor unit consisting of an armature and a coil through which current flows, weight on the platform adjusting the armature in the coil of the reactor, and an ammeter electrically connected to each of said coils, each ammeter being calibrated in pounds, a vertical standard rising from the base, and weight indicating means mounted on the standard electrically connected to a coil of each of the reactors, said weight indicating means indicating the direction of body weight deviation from the norm, said weight indicating means including a calibrated transparent hemisphere, means on which the hemisphere is mounted including two angularly arranged axes to move said hemisphere synchronously with the movement of the platforms when weight is placed thereon, said last named means being electrically connected to the reactor units, a center marked arm on the vertical standard and arranged below the hemisphere and observable therethrough, said hemisphere moving with relation to the center marked arm to indicate unbalanced condition.

KARL J. KRAUS.

References Cited in the file of this patent

UNITED STATES PATENTS

| Number | Name | Date |
|---|---|---|
| 2,081,367 | Nicolson | May 25, 1937 |
| 2,210,970 | Bonell | Aug. 13, 1940 |
| 2,374,105 | Kraus | Apr. 17, 1945 |
| 2,470,069 | Davies | May 10, 1949 |
| 2,487,956 | Toftness | Nov. 15, 1949 |